US011059586B2

(12) United States Patent
Cuddy (10) Patent No.: US 11,059,586 B2
(45) Date of Patent: Jul. 13, 2021

(54) STRUCTURAL SPACER MEMBERS

(71) Applicant: THE BOEING COMPANY, Chicago, IL (US)

(72) Inventor: Nathanial C. Cuddy, Snohomish, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/425,664

(22) Filed: May 29, 2019

(65) Prior Publication Data

US 2020/0378150 A1  Dec. 3, 2020

(51) Int. Cl.
| | |
|---|---|
| *B64D 11/00* | (2006.01) |
| *E04C 5/20* | (2006.01) |
| *F16M 13/02* | (2006.01) |
| *F16B 43/00* | (2006.01) |
| *F16M 11/08* | (2006.01) |
| *E05B 9/08* | (2006.01) |
| *E05B 9/00* | (2006.01) |

(52) U.S. Cl.
CPC ............ *B64D 11/003* (2013.01); *E04C 5/203* (2013.01); *F16B 43/00* (2013.01); *F16M 13/02* (2013.01); *E05B 9/08* (2013.01); *E05B 2009/006* (2013.01); *F16M 11/08* (2013.01)

(58) Field of Classification Search
CPC .. E04C 5/203; E04C 5/16; E04C 5/208; E04F 13/0805; F16B 43/00; B60G 11/28; B60G 2204/126; B60G 2202/152; B60G 2206/911; B60G 2204/43; B60G 2204/44; B60G 2204/4402; B64D 11/003; B64D 11/00; F16M 11/08; F16M 13/02

USPC ....................................................... 248/220.22
See application file for complete search history.

(56) References Cited

U.S. PATENT DOCUMENTS

| | | | | |
|---|---|---|---|---|
| 1,741,784 A | * | 12/1929 | Lucas ................ | B61D 33/0085 248/425 |
| 3,083,796 A | | 4/1963 | Bell | |
| 3,420,491 A | * | 1/1969 | Gilbert .................... | E04G 17/06 249/216 |
| 3,469,817 A | * | 9/1969 | Bowden ................ | E04G 15/063 249/183 |
| 3,516,633 A | * | 6/1970 | Blackwood .......... | A47B 13/021 248/188 |
| 3,611,953 A | * | 10/1971 | Schottl ................... | A47B 11/00 108/139 |

(Continued)

OTHER PUBLICATIONS

Notice of Reasons for Rejection dated Jul. 7, 2020 received in the corresponding JP Design Application No. 2019-026214, with English translation, pp. 1-3.

*Primary Examiner* — Jonathan Liu
*Assistant Examiner* — Taylor L Morris
(74) *Attorney, Agent, or Firm* — Moore Intellectual Property Law, PLLC (57) ABSTRACT

A rigid member configured to maintain components in spaced relationship is disclosed. An outer wall portion of the rigid member is arranged substantially concentric about a central axis and a fastener-receiving portion is arranged within the outer wall portion. The fastener-receiving member defines a central bore extending therethrough and oriented substantially concentric about the central axis. A plurality of interconnecting portions extend between the outer wall portion and the fastener-receiving portion.

25 Claims, 7 Drawing Sheets

(56) References Cited

U.S. PATENT DOCUMENTS

| | | | | |
|---|---|---|---|---|
| 4,273,618 A * | 6/1981 | Strang, Sr. | ............... | B01D 3/22 |
| | | | | 202/158 |
| 4,467,990 A * | 8/1984 | Wiseman | ............. | A47F 5/0823 |
| | | | | 248/220.31 |
| 4,566,664 A * | 1/1986 | Donald | .................. | A47B 11/00 |
| | | | | 248/349.1 |
| 4,799,845 A * | 1/1989 | Hrysko | .................. | E04D 5/143 |
| | | | | 411/542 |
| 4,948,083 A * | 8/1990 | McNaney, Jr. | ........ | A01K 91/08 |
| | | | | 248/289.11 |
| 5,013,081 A * | 5/1991 | Cronce | ................ | B62D 35/007 |
| | | | | 296/180.1 |
| 5,125,616 A * | 6/1992 | Rothenbuehler | ..... | E04G 17/064 |
| | | | | 249/177 |
| 5,281,878 A * | 1/1994 | Schaeffer | ................ | H02K 7/14 |
| | | | | 310/87 |
| D358,545 S | 5/1995 | Price | | |
| D362,382 S | 9/1995 | Cloud | | |
| D371,957 S | 7/1996 | Hinton et al. | | |
| 5,542,785 A * | 8/1996 | Cloud | ....................... | E02D 5/34 |
| | | | | 249/83 |
| 5,569,876 A * | 10/1996 | Podgorski | ............ | H01B 7/0233 |
| | | | | 174/137 R |
| D382,463 S | 8/1997 | Cloud | | |
| 5,788,224 A * | 8/1998 | Platt | ..................... | E04H 17/1421 |
| | | | | 256/66 |
| 5,810,306 A * | 9/1998 | Hung | ......................... | B25J 1/02 |
| | | | | 248/160 |
| 6,024,343 A * | 2/2000 | Ebert | ......................... | B60G 11/28 |
| | | | | 267/124 |
| 6,250,613 B1 * | 6/2001 | Koeske | .................. | B60G 11/28 |
| | | | | 267/122 |
| 6,604,330 B2 * | 8/2003 | Repasky | ............... | E04D 11/005 |
| | | | | 411/395 |
| 6,978,570 B1 * | 12/2005 | Clark | .................... | A01K 91/08 |
| | | | | 114/255 |
| 7,128,295 B2 * | 10/2006 | Scown | .................. | B64D 11/003 |
| | | | | 244/118.1 |
| D559,080 S | 1/2008 | Boote | | |
| 7,328,887 B2 * | 2/2008 | Leonard | ................ | B60G 11/28 |
| | | | | 267/122 |
| 7,364,234 B2 * | 4/2008 | Begin | ...................... | A47C 3/18 |
| | | | | 248/425 |
| 7,475,893 B2 * | 1/2009 | Chamberlin | ........... | B60G 9/003 |
| | | | | 280/124.116 |
| 7,544,142 B2 * | 6/2009 | Schuler | ................ | B60N 2/2352 |
| | | | | 475/149 |
| 7,588,576 B2 * | 9/2009 | Teague | ................ | A61B 17/1735 |
| | | | | 606/280 |
| 7,624,491 B2 * | 12/2009 | Polus | ..................... | B29C 37/005 |
| | | | | 29/464 |
| 7,704,009 B2 * | 4/2010 | Boote | .................. | F04D 29/263 |
| | | | | 403/408.1 |
| 7,793,472 B2 * | 9/2010 | Dries | ...................... | E06B 1/603 |
| | | | | 52/214 |
| 7,866,096 B2 * | 1/2011 | Lee | .................... | E04F 15/02476 |
| | | | | 248/351 |
| D641,611 S | 7/2011 | Minayoshi | | |
| 8,061,691 B2 * | 11/2011 | Levy | ...................... | B60G 11/28 |
| | | | | 267/64.21 |
| 8,087,207 B2 * | 1/2012 | Ghiringhelli | ........... | E04B 1/003 |
| | | | | 52/252 |
| 8,262,022 B2 * | 9/2012 | Young | .................. | B64D 11/003 |
| | | | | 244/118.5 |
| 8,302,945 B2 * | 11/2012 | Gawinski | ............... | B60G 13/10 |
| | | | | 267/122 |
| D683,615 S | 6/2013 | Noumi et al. | | |
| D683,616 S | 6/2013 | Noumi et al. | | |
| 8,635,815 B2 * | 1/2014 | Bordin | .............. | E04F 15/02022 |
| | | | | 33/526 |
| 8,919,070 B2 * | 12/2014 | Moses | ................. | E04F 13/0805 |
| | | | | 403/391 |
| 9,016,653 B1 * | 4/2015 | Cox, Jr. | ............. | B65D 19/0002 |
| | | | | 248/346.01 |
| 9,261,157 B2 * | 2/2016 | Leonard | ................ | B60G 11/27 |
| 9,512,824 B2 * | 12/2016 | Brabander | ........... | H02G 3/0462 |
| 9,829,148 B2 * | 11/2017 | Choquette | .......... | F16M 11/2014 |
| 2005/0175430 A1 * | 8/2005 | Madden, III | ............ | F16B 43/00 |
| | | | | 411/119 |
| 2005/0279905 A1 * | 12/2005 | Parker | ...................... | F24F 7/007 |
| | | | | 248/346.01 |
| 2006/0226586 A1 * | 10/2006 | Levy | ...................... | B60G 11/28 |
| | | | | 267/64.27 |
| 2008/0112754 A1 * | 5/2008 | Schmitz | .................. | B60R 5/003 |
| | | | | 403/350 |
| 2011/0158768 A1 * | 6/2011 | Schraer | ................. | F16B 39/282 |
| | | | | 411/427 |
| 2011/0222990 A1 * | 9/2011 | Rose | ....................... | F16B 43/00 |
| | | | | 411/531 |
| 2012/0273615 A1 * | 11/2012 | Rafler | ................... | B64D 11/003 |
| | | | | 244/118.5 |
| 2013/0307567 A1 * | 11/2013 | Bolbocianu | ........... | G01D 11/30 |
| | | | | 324/661 |
| 2014/0091548 A1 * | 4/2014 | Ratz | ....................... | B60G 11/27 |
| | | | | 280/124.157 |
| 2014/0205368 A1 * | 7/2014 | Kramer | .................. | B32B 37/12 |
| | | | | 403/267 |
| 2014/0230700 A1 * | 8/2014 | Hardikar | ................ | F16M 13/02 |
| | | | | 108/42 |
| 2014/0252702 A1 * | 9/2014 | Trowbridge | .......... | F16F 9/0454 |
| | | | | 267/122 |
| 2015/0330566 A1 * | 11/2015 | Inoue | ....................... | F16S 5/00 |
| | | | | 428/167 |
| 2016/0176291 A1 * | 6/2016 | Nonnenbroich | ........ | B60K 37/04 |
| | | | | 248/201 |
| 2019/0217964 A1 * | 7/2019 | Alstad | .................... | F16M 13/02 |
| 2020/0173604 A1 * | 6/2020 | Corsi | ..................... | F16M 13/02 |

* cited by examiner

STRUCTURAL SPACER MEMBERS

FIELD OF THE DISCLOSURE

The present disclosure relates generally to rigid members, and more particularly to structural spacer members used for holding and maintaining two structural components in a spaced relationship to one another.

BACKGROUND

Commercial aircraft are generally constructed from modular components, the size, weight, and construction of which are dictated by many considerations, including fuselage dimensions, aesthetic, and safety considerations. Typically, commercial aircraft include overhead storage bins for storage of carry-on luggage and other items. While overhead storage bins may take a variety of forms, storage compartments with lowerable storage bins have been widely used on commercial aircraft and in other applications for a number of years. Such overhead storage bins include support structures mounted along the ceiling and sidewalls, above the seats in the passenger cabin of the aircraft.

Various metallic fastening systems have been used for the assembly of the overhead storage bins and for fastening the support structure of the overhead storage bin to the interior of the aircraft. Typically, metallic male fasteners are used with mating metallic female fasteners to attach the support structure to the aircraft and to assemble the components of the overhead storage bins. The metallic male fastener components include, for example, threaded pins or lockbolts. The metallic female mating components may take the form of threaded collars and nuts.

Spacers or inserts may be used between the components to position the components of the overhead storage bins at desired distances from other compoents and structures. The spacers can have various thickness depending on the required spaced relationship between the components being attached. The spacers can also have different fastening profile configurations depending on the arrangement and the number of fasteners necessary to secured the components together.

Traditional spacers have been used for the installation and assembly of the overhead storage bins and for the attachment of the supporting structure of the overhead storage bins to the aircraft. The spacers consist of a solid unitary block of material having one or more bores extending therethrough. The spacers are typically manufactured by machining a length of bar/round stock to particular spacer dimensions. However, machining bar/round stock is a relatively time-consuming process and results in a significant waste of material. Further, machining spacers from bar/round stock is relatively expensive, resulting in high cost of spacers. In addition, spacers machined from bar/stock are relatively heavy, increasing the weight of the aircraft since the assembly of overhead storage bins requires the use of a large quantity of spacers.

Spacers may also be manufactured with a stamped metal insert positioned within a single central bore of the one-piece machined stock spacer. However, the metal insert spacers suffer from the same drawback as the one-piece machined stock spacers. For example, use of metallic components increases the weight and material costs of the spacers as well as increases the production time of the spacers. Further, the metal insert spacers are limited to fastening systems having a single central fastener and may be unable to be used for attaching components requiring multiple fasteners having various fastener profile configurations.

SUMMARY

The present disclosure describes rigid members or spacers that can be used to hold and maintain components in a spaced relationship to one another. The rigid members can be economically fabricated to accommodate different fastener configurations and readily sized in various lengths/heights with little or no waste of valuable stock material. For example, the rigid members can be manufactured from light weight and inexpensive materials. Further, the rigid members have a single piece construction that combines multiple fastener configurations so that the rigid members can be used for multiple applications. The multiple fastener configurations allow an installer to easily identify the correct spacer to use for spacing apart particular components and to install the spacer in a correct orientation. Thus, the rigid members prevent an installer from mounting the rigid member incorrectly.

In a particular example, a rigid member is configured to maintain components in spaced relationship. An outer wall portion of the rigid member is arranged substantially concentric about a central axis, and a fastener-receiving portion is arranged within the outer wall portion. The fastener-receiving portion defines a central bore extending therethrough and oriented substantially concentric about the central axis. A plurality of interconnecting portions extend between the outer wall portion and the fastener-receiving portion.

In another particular example, a rigid member is configured to maintain components in spaced relationship. An outer wall portion of the rigid member is arranged substantially concentric about a central axis. An inner ring portion is spaced apart from the outer wall portion and is arranged substantially concentric about the central axis. One or more interconnecting members extend between the outer wall portion and the inner ring portion. A central portion defines a central bore extending therethrough and is arranged substantially concentric about the central axis. A plurality of fastener-receiving portions are positioned between the central portion and outer wall portion. The plurality of fastener-receiving portions are positioned at circumferentially spaced locations about the central axis and each of the plurality of first fastener-receiving portions defines a bore extending therethrough.

The features, functions, and advantages described herein can be achieved independently in various implementations or may be combined in yet other implementations, further details of which can be found with reference to the following description and drawings.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1, fastener-receiving portions are illustrated and associated with reference numbers 174A, 174B, and 174C. When referring to a particular one of these fastener-receiving portions, such as the fastener-receiving portion 174A, the distinguishing letter "A" is used. However, when referring to any arbitrary one of these fastener-receiving portions or to these fastener-receiving portions as a group, the reference number 174 may be used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, the terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

Figure 1:
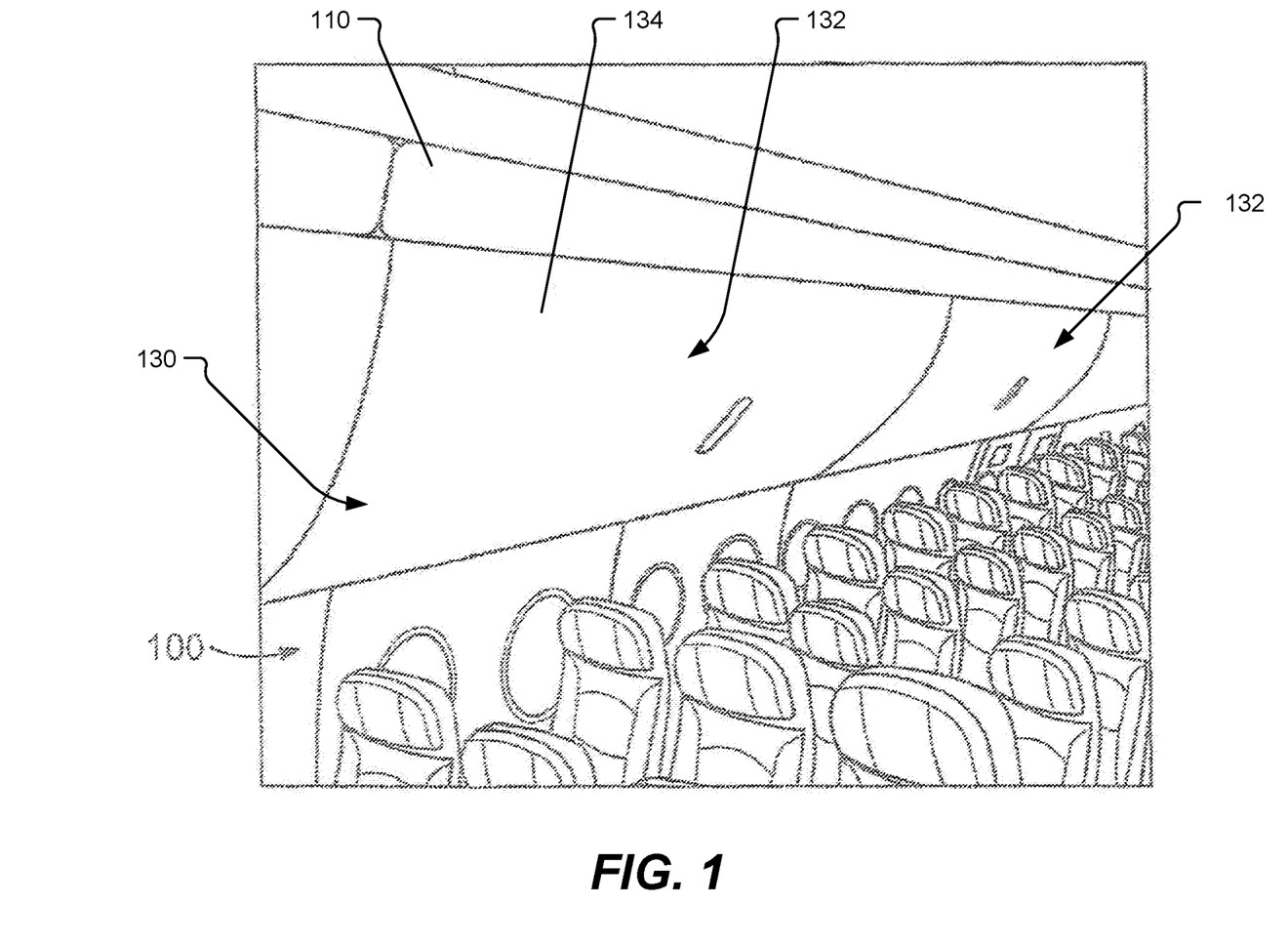
FIG. 1 is an illustration of an aircraft interior illustrating an overhead storage system.

Referring now to the drawings, FIG. 1 schematically illustrates a representation of an aircraft cabin 100 having an overhead support structure 110 attached to the interior of an aircraft fuselage. The overhead support structure 110 is configured to provide a framework to support an overhead storage system 130. The overhead storage system 130 includes a row of overhead storage bins 132 extending along the side walls and ceiling of the aircraft cabin 100. The overhead storage bins 132 may be accessible from an aisle extending along the aircraft cabin 100.

Figure 2:
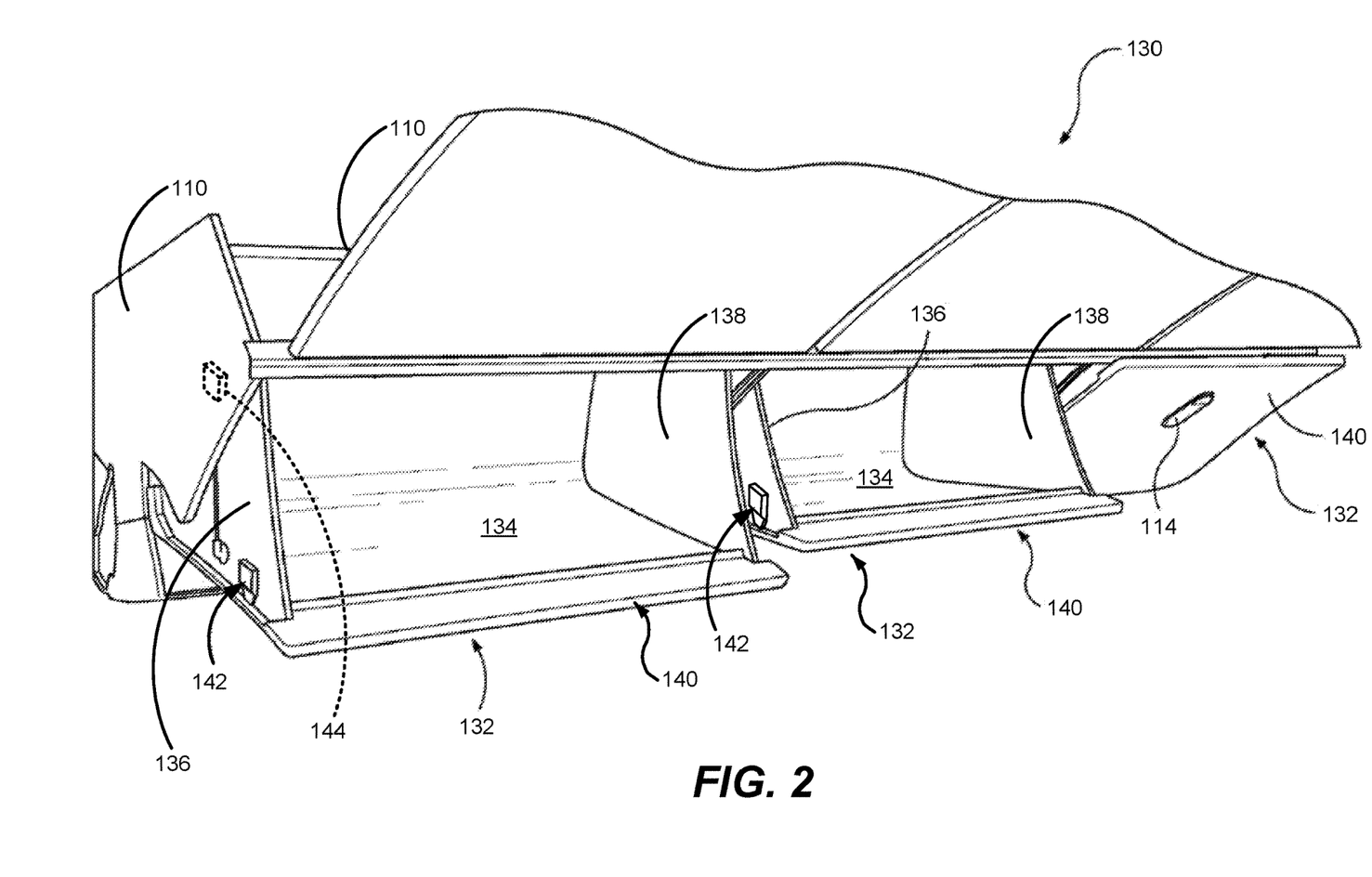
FIG. 2 is an illustration of overhead storage bins of the overhead storage system of FIG. 1.
Figure 4:
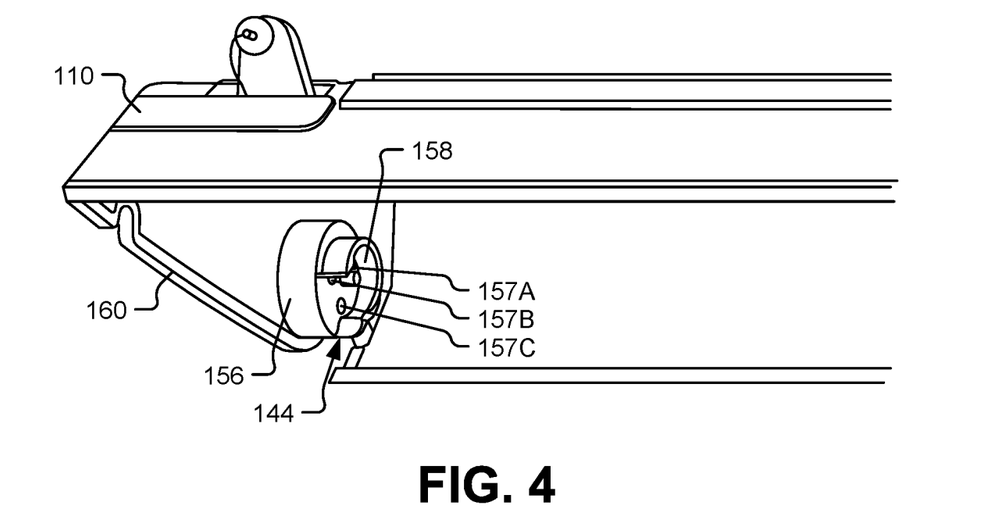
FIG. 4 is a partial perspective view of an overhead support structure of the overhead storage system of FIG. 2.

As shown in FIG. 2, each of the overhead storage bins 132 includes a bucket 134 rotatably coupled (e.g., pivotably coupled) to the overhead support structure 110. Each of the buckets 134 has a pair of opposing side panels 136 and 138 and a door 140 that extends between the opposing side panels 136 and 138. A latch mechanism 142 (one being shown) is mounted to each side panel 136 and 138 of the bucket 134 and is configured to engage a fixed latch mechanism 144, as shown in FIG. 4, that is statically mounted to each sidewall of the overhead support structure 110 to secure the bucket 134 in a closed position. A handle or activation device 114 is mounted on the door 140 of each overhead storage bin 132 to enable a user to selectively disengage the latching mechanism 142 from the fixed latch mechanism 144 to open the bucket 134 of the overhead storage bins 132.

Figure 3:
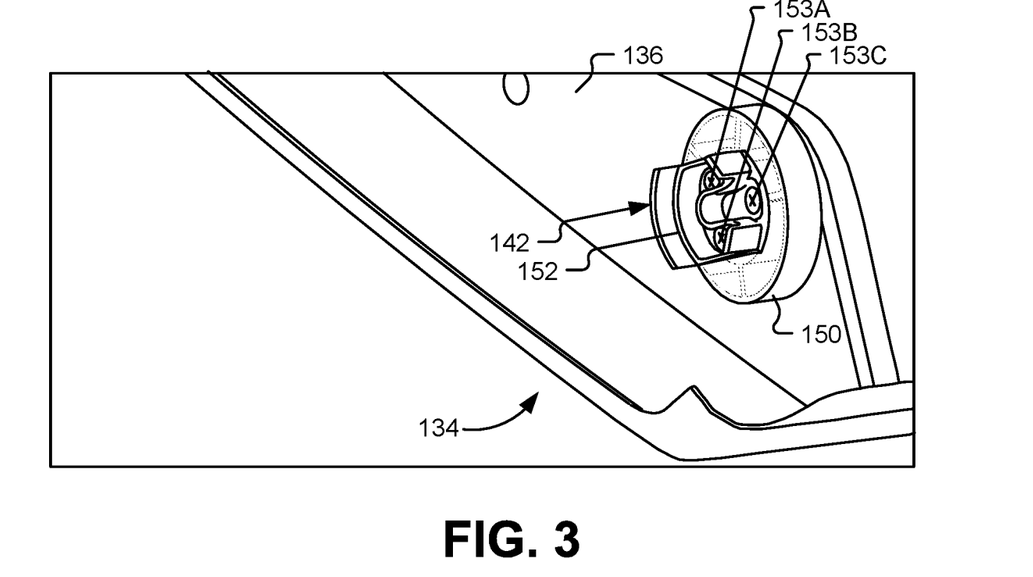
FIG. 3 is a partial perspective view of a bucket of an overhead storage bin of FIG. 2.

As shown in FIG. 3, a rigid member or spacer 150 is installed between the latching mechanism 142 and the side wall 136 of the bucket 134. The latching mechanism 142 includes a male pivot fitting 152 secured to the rigid member 150 by three fasteners 153A, 153B, and 153C. The fasteners 153A, 153B, and 153C extend through bores in the rigid member 150 for mating engagement with a female mating member formed in the side wall 136 of the bucket 134. Similarly, as shown in FIG. 4, a spacer or rigid member 156 is installed between the fixed latch mechanism 144 and the overhead support structure 110 of the overhead storage system 130. The fixed latch mechanism 144 includes a female pivot fitting 158 secured to the rigid member 156 by three fasteners 157A, 157B, and 157C. The female pivot fitting 158 is adapted to receive and secure the latching mechanism 142 of the bucket 134 of the overhead storage bin 132. The fasteners 157A, 157B, and 157C extend through bores in the rigid member 156 for mating engagement with a female mating member formed in a side wall 160 of the overhead support structure 110.

Figure 5:
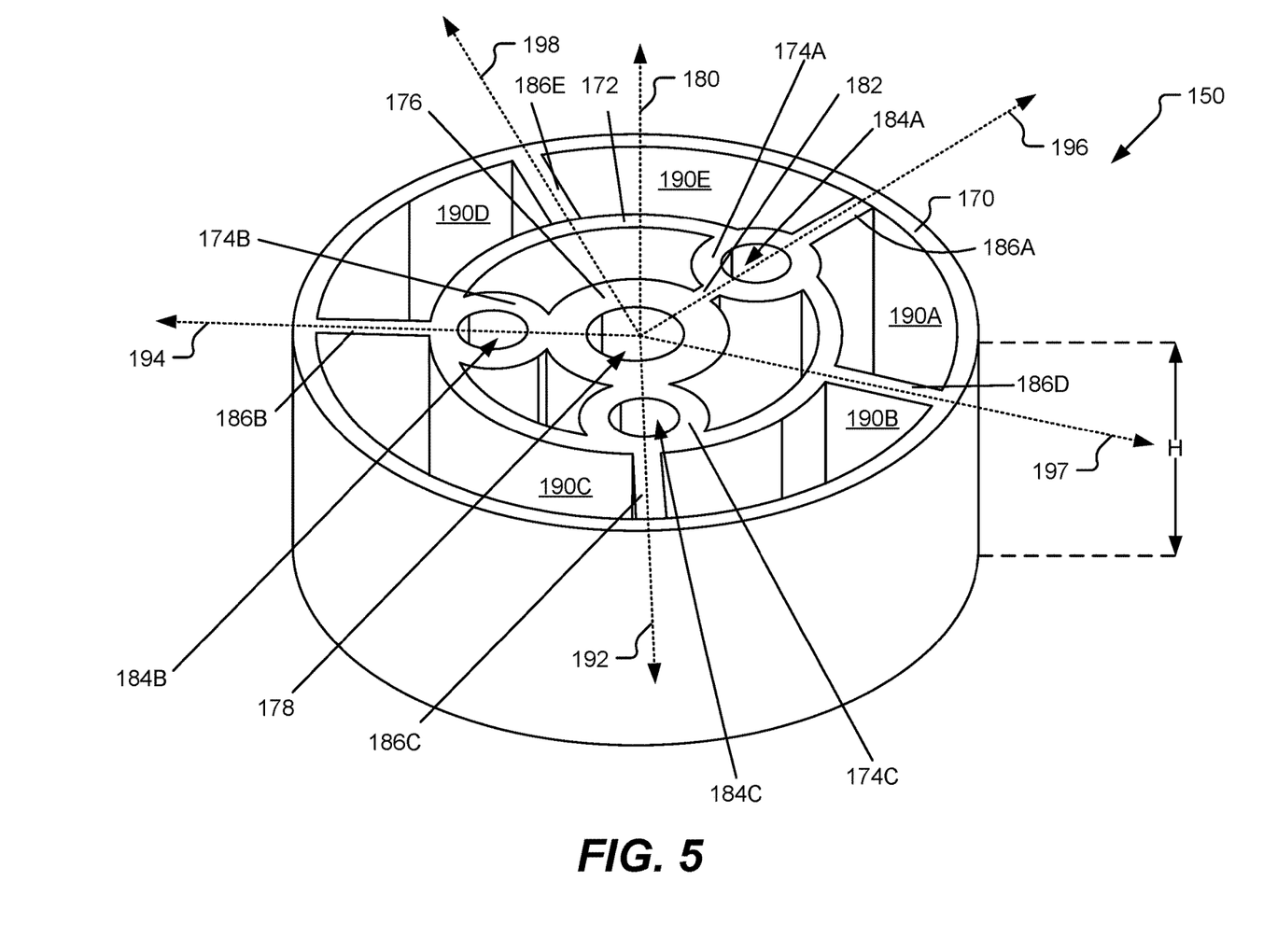
FIG. 5 is a top perspective view of a rigid member in accordance with a particular example.

Referring now to FIG. 5, an example of the rigid member 150 is shown. The rigid member 150 includes of a tubular structural body having a circular cross-section with uniform height or thickness H. The rigid member 150 can be manufactured from a light weight material having any desired height or thickness. For example, the rigid member 150 is fabricated from a polymer, such as nylon, polyamide polyester, polyphenylene sulfide, polyethylene, or polypropylene. Since a large quantity of rigid members 150 are used for the installation of the overhead storage system 130, the weight of the aircraft is reduced by installing the rigid members instead of heavier traditional spacers. As a result, the performance of the aircraft, such as payload capacities and fuel efficiencies, is improved.

The rigid member 150 can be formed of plastic by extrusion or injection molding. For example, the rigid member can be manufactured by a continuous extrusion process to form a long tube. The tube can then be cut to desired lengths to make rigid members for different applications, e.g., cut to one length to make a wide spacer and cut to a different length to make a narrow spacer. As a result, the ridge member can be economically manufactured and fewer parts need to be kept on hand.

Figure 6:
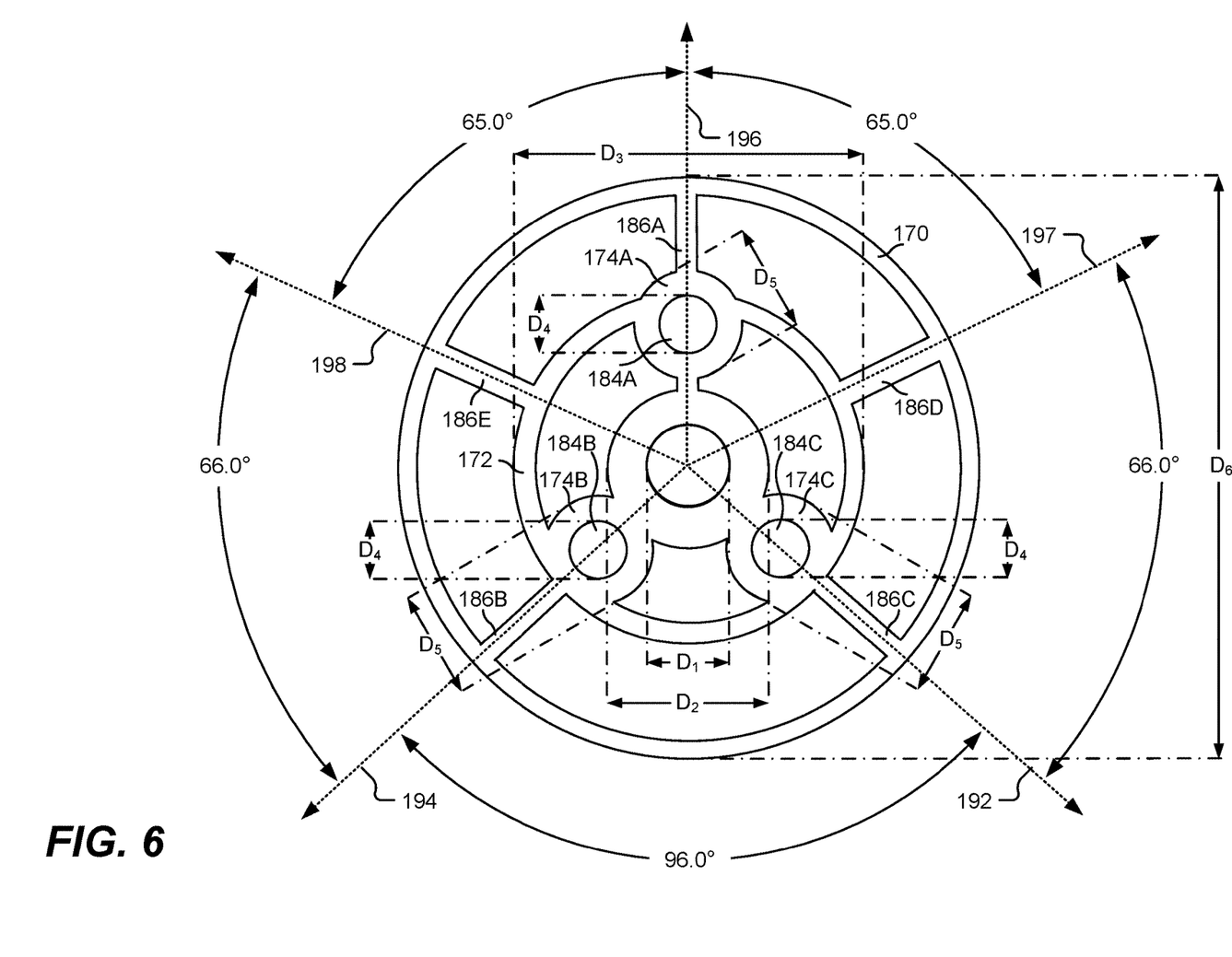
FIG. 6 is a top, plan view of the rigid member of FIG. 5.

As shown in FIG. 5, the rigid member 150 includes an outer wall portion 170, an inner bearing wall or inner ring portion 172, fastener-receiving portions 174A, 174B, and 174C, and a central portion 176. The central portion 176 has a circular cross-section but it can have any suitable cross-sectional shape. The central portion 176 defines a central bore 178 extending therethrough. The central bore 178 is adapted to allow a shaft of a fastener to be placed therethrough for mating engagement with another structure. As shown in FIG. 6, the central bore 178 has a diameter $D_1$ of between 0.25 inches and 0.40 inches, and the central portion 176 has an outer diameter $D_2$ of between 0.45 inches and 0.70 inches. In one example, the central portion 176 has an outer diameter $D_2$ of about 0.62 inches, and the central bore 178 has a diameter $D_1$ of about 0.32 inches.

The inner ring portion 172 of the rigid member 150 is spaced apart from and substantially encircles the central portion 176. The inner ring portion 172 has a circular cross-section and is arranged substantially concentric about a central axis 180 extending through the center of the central bore 178. The inner ring portion 172 has an outer diameter $D_3$ of between 1 inch and 2 inches. In one example, the inner ring portion 172 has an outer diameter $D_3$ of about 1.4 inches.

The fastener-receiving portions 174A, 174B, and 174C of the rigid member 150 are positioned at circumferential locations about the central axis 180. The arrangement and positioning of the fastener-receiving portions 174A, 174B, and 174C prevents an installer from using an incorrect rigid member and installing the rigid member 150 in an improper orientation. Each of the fastener-receiving portions 174A, 174B, and 174C has a circular cross-section but can have any suitable cross-sectional shape. The fastener-receiving portions 174B and 174C are formed between the central portion 176 and the inner ring portion 172. The fastener-receiving portion 174A is spaced from the central portion 176 and an interconnecting member 182 is formed between the fastener-receiving portion 174A and the central portion 176. In one example, the fastener-receiving portion 174A is spaced at a greater distance from the central axis 180 than the fastener-receiving portions 174B and 174C.

Referring still to FIG. 5, each of the fastener-receiving portions 174A, 174B, and 174C defines a respective bore 184A, 184B, and 184C extending therethrough. Each of the bores 184A, 184B, and 184C of the fastener-receiving portions 174A, 174B, and 174C are adapted to allow a shaft of a fastener to be positioned therethrough for mating engagement with another component or structure. As shown in FIG. 6, each of the bores 184A, 184B, and 184C of the fastener-receiving portions 174A, 174B, and 174C has a diameter $D_4$ of between 0.2 inches and 0.3 inches, and each of the fastener-receiving portions 174A, 174B, and 174C has a diameter $D_5$ of between 0.4 inches and 0.5 inches. In one example, each fastener-receiving portions 174A, 174B, and 174C has a diameter $D_5$ of 0.42 inches and each bore 184A, 184B, and 184C has a diameter $D_4$ of about 0.22 inches.

The outer wall portion 170 of the rigid member 150 is concentric with and spaced radially from the inner ring portion 172. The outer wall portion 170 has a circular cross-section and has an outer diameter $D_6$ of between 2 inches and 3 inches. In one example, the outer wall portion 170 has an outer diameter $D_6$ of about 2.25 inches.

As shown in FIG. 6, interconnecting portion 186A is formed and extends between the fastener-receiving portion 174A and the outer wall portion 170. Interconnecting portions 186B, 186C, 186D, and 186E are formed and extend between the inner ring portion 172 and the outer wall portion 170. The interconnecting portions 186A, 186B, 186C, 186D, and 186E are positioned at circumferentially spaced locations about the central axis 180 to form openings 190A, 190B, 190C, 190D, and 190E between the inner ring portion 172 and the outer wall portion 170.

As shown in FIGS. 5 and 6, interconnecting portion 186C is oriented in a radial direction between the inner ring portion 172 and the outer wall portion 170 along an imaginary straight line 192 that intersects a central axis of the bore 184C of the fastener-receiving member 174C and intersects the central axis 180 of the central bore 178. Interconnecting member 186B is oriented in a radial direction between the inner ring portion 172 and the outer wall portion 170 along an imaginary straight line 194 that intersects a central axis of the bore 184B of the fastener-receiving member 174B and intersects the central axis 180 of the central bore 178. The line 192 extending through the interconnecting portion 186C is oriented at an angle of about 96 degrees relative to the line 194 extending through the interconnecting portion 186B.

Referring to FIG. 6, interconnecting member 186A is oriented in a radial direction between the inner ring portion 172 and the outer wall portion 170 along an imaginary straight line 196 that intersects a central axis of the bore 184A of the fastener-receiving member 174A and intersects the central axis 180 of the central bore 178. Interconnecting portion 186D is oriented in a radial direction between the inner ring portion 172 and the outer wall portion 170 along an imaginary straight line 197 that intersects with the central axis 180 of the central bore 178. The line 197 extending through interconnecting member 186D is oriented at an angle of about 66 degrees relative to the line 192 extending through interconnecting member 186C, and the line 197 extending through interconnection member 186D is oriented at an angle of about 65 degrees relative to the line 196 extending through interconnecting member 186A.

Interconnecting portion 186E is oriented in a radial direction between the inner ring portion 172 and the outer wall portion 170 along an imaginary straight line 198 that intersects with the central axis 180 of the central bore 178. The line 198 extending through interconnecting portion 186E is oriented at an angle of about 66 degrees relative to the line 194 extending through interconnecting portion 186B, and the line 198 extending through interconnecting portion 186E is oriented at an angle of about 65 degrees relative to the line 196 extending through interconnecting portion 186A.

Figure 7:
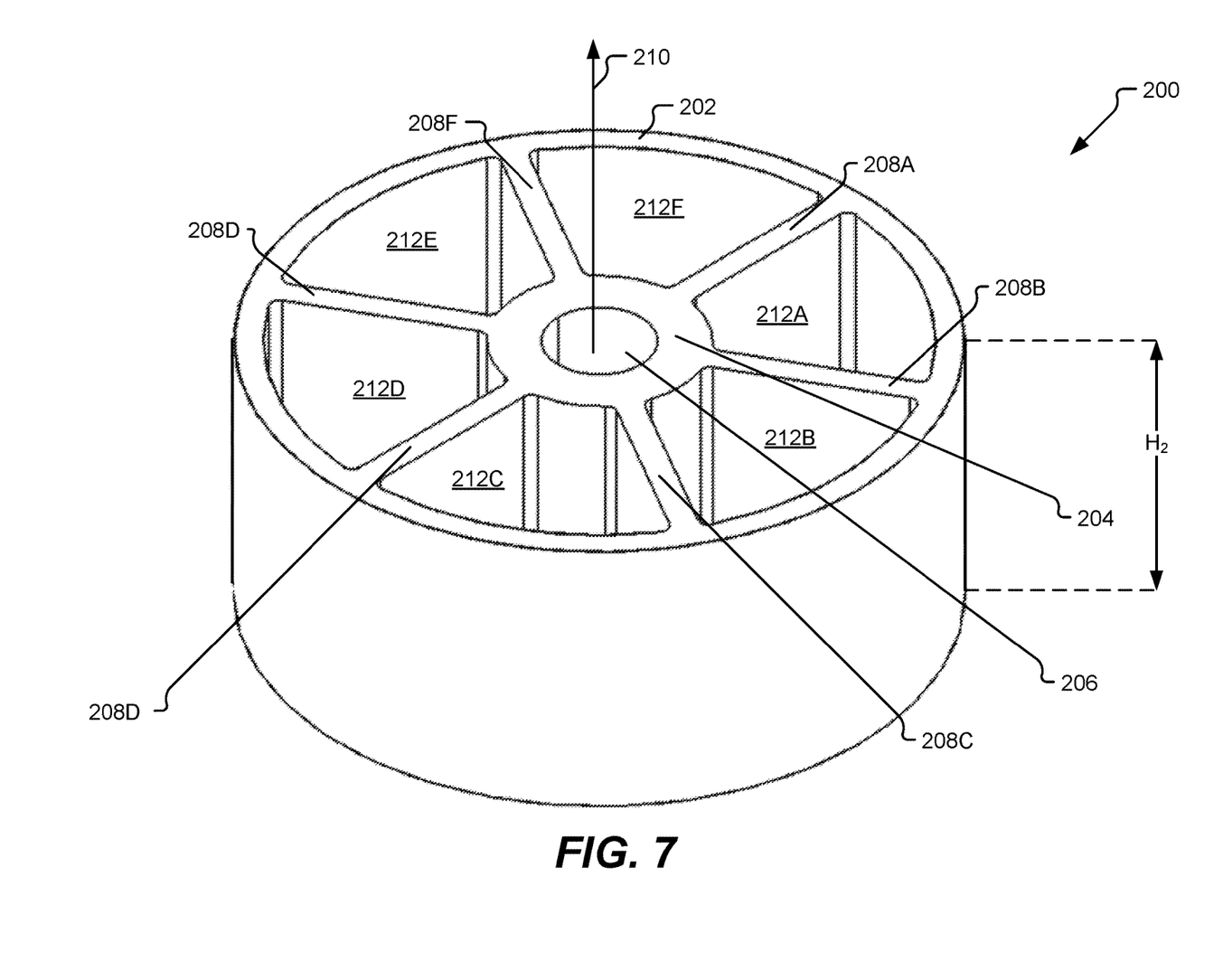
FIG. 7 is a top perspective view of a rigid member in accordance with another particular example.

Referring now to FIG. 7, another example of a rigid member 200 is shown. The rigid member 200 includes of a tubular structural body having a circular cross-section with uniform height or thickness $H_2$. The rigid member 200 can be manufactured with any desired height or thickness. The rigid member 200 is manufactured from an inexpensive and light weight material. For example, the rigid member 200 is fabricated from a polymer, such as nylon, polyamide polyester, polyphenylene sulfide, polyethylene, or polypropylene.

The rigid member 200 can be formed of plastic by extrusion or injection molding. For example, the rigid member can be manufactured by a continuous extrusion process to form a long tube. The tube can then be cut to desired lengths to make rigid members for different applications, e.g., cut to one length to form a wide spacer and cut to a different length to form a narrow spacer. As a result, the ridge member 200 can be economically manufactured and fewer parts need to be kept on hand.

The rigid member 200 includes an outer wall portion 202 and a fastener-receiving portion 204 defining a central bore 206 extending therethrough. The fastener-receiving portion 204 has a circular cross-section but can have any suitable cross-sectional shape. The central bore 206 is adapted to allow a shaft of a fastener to be placed therethrough for mating engagement with another structure. The configuration of rigid member 200 allows an installer to use the rigid member 200 for numerous applications and the installer can select an appropriate rigid member having a particular height to suit the particular spacing requirements.

Figure 8:
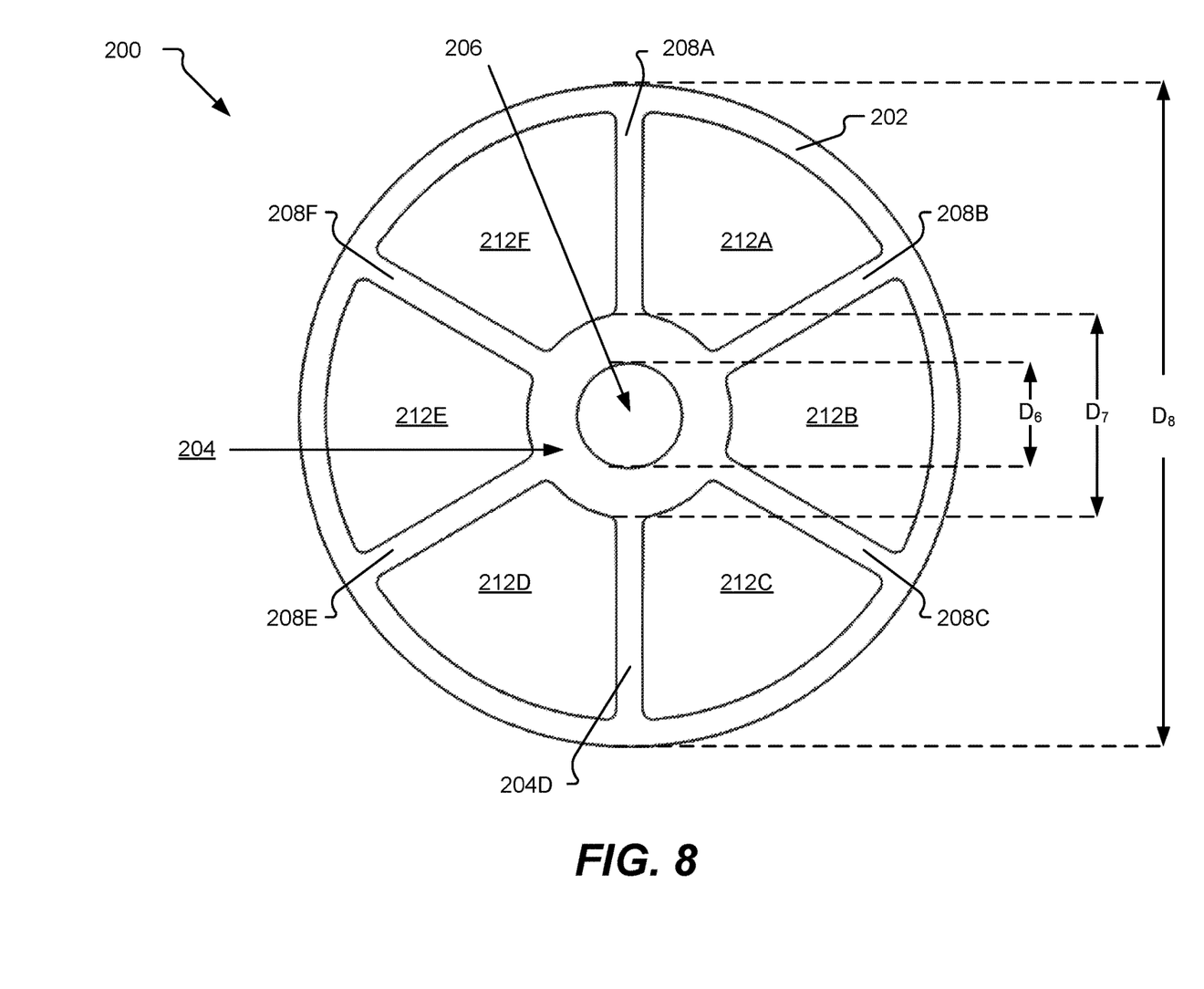
FIG. 8 is a top, plan view of the rigid member of FIG. 7.

As shown in FIG. 8, the central bore 206 has a diameter $D_7$ of between 0.25 inches and 0.40 inches, and the fastener-receiving portion 204 has an outer diameter $D_8$ of between 0.45 inches and 0.70 inches. In one example, the fastener-receiving portion 204 has an outer diameter $D_8$ of about 0.62 inches and the central bore 206 has a diameter $D_7$ of about 0.32 inches.

As shown in FIGS. 7 and 8, the outer wall portion 202 of the rigid member 200 is spaced apart from the fastener-receiving portion 204 and has a circular cross-section. In one example, the outer wall portion 202 has an outer diameter $D_9$ of about 2 inches. Interconnecting portions 208A, 208B, 208C, 208D, 208E, and 208F are formed and extend between the outer wall portion 202 and the fastener-receiving portion 204. The interconnecting portions 208A, 208B, 208C, 208D, 208E, and 208F are positioned at circumferentially spaced locations about a central axis 210 forming openings 212A, 212B, 212C, 212D, 212E, and 212F between the fastener-receiving portion 204 and outer wall portion 202. As shown in FIG. 8, the interconnecting portions 208A, 208B, 208C, 208D, 208E, and 208F are positioned at equal distant circumferentially spaced locations about the central axis 210, forming an angle of about 60 degrees between each of the interconnecting portions 208A, 208B, 208C, 208D, 208E, and 208F.

The present disclosure describes rigid members or spacers that can be used to hold and maintain components in a spaced relationship to one another. The rigid members can be economically fabricated to accommodate different fastener configurations and readily sized in various lengths or heights. For example, the rigid members can be manufactured from light weight and inexpensive materials. Further, the rigid members have a single piece construction that combines multiple fastener configurations so that rigid member can be used for multiple applications. The fastener configurations allow an installer to easily identify the correct spacer to use for spacing apart particular components and to install the spacer in a correct orientation. Thus, the rigid members prevent an installer from mounting the rigid members incorrectly.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A rigid member configured to be cut to selected lengths to form spacers for assembly of a storage bin assembly, the rigid member comprising:
    an outer wall portion substantially concentric to a central axis, the outer wall portion having a length;
    a first inner wall portion offset inward from the outer wall portion, wherein the first inner wall portion is concentric to the central axis;
    a plurality of interconnecting portions that couple the outer wall portion to the first inner wall portion, wherein the interconnecting portions of the plurality of interconnecting portions have the length;
    a first fastener-receiving portion offset inward from the first inner wall portion, wherein the first fastener-receiving portion defines a central bore, and wherein a location of the first fastener-receiving portion is configured to enable a fastener, with a portion of the fastener positioned in the central bore, to couple a first spacer cut from the rigid member to a support member of the storage bin assembly;
    second fastener-receiving portions coupled to the first inner wall portion and the first fastener-receiving portion, each second fastener-receiving portion separated from the outer wall portion by a respective interconnecting portion of the plurality of interconnecting portions, wherein each of the second fastener-receiving portions has a second bore, and wherein a second bore central axis of each second bore is located a first distance from the central axis; and
    a third fastener-receiving portion coupled to the first inner wall portion and the first fastener-receiving portion, the third fastener-receiving portion separated from the outer wall portion by a respective interconnecting portion of the plurality of interconnecting portions and the third fastener-receiving portion having a third bore with a third bore central axis located a second distance from the central axis different than the first distance, wherein locations of the second bores and the third bore of the rigid member are configured to enable a second spacer cut from the rigid member to be secured between a first pivot member and a wall of a storage bin of the storage bin assembly by first fasteners in working relation with the second bores and the third bore, and wherein the locations of the second bores and the third bore of the rigid member are configured to enable a third spacer cut from the rigid member to be secured between a second pivot member and a support wall of the storage bin assembly by second fasteners in working relation with the second bores and the third bore.

2. The rigid member of claim 1, wherein each of the plurality of interconnecting portions is oriented along a radial line passing through the central axis.

3. The rigid member of claim 1, wherein the outer wall portion and the first fastener-receiving portion are positioned to define a plurality of openings arranged angularly between the first fastener-receiving portion and the outer wall portion.

4. The rigid member of claim 1, wherein the outer wall portion is arranged in a substantially circular configuration.

5. The rigid member of claim 1, wherein each of the plurality of interconnecting portions has a first end and a second end, the first end of each of the plurality of interconnecting portions being connected to the outer wall portion and the second end of each of the plurality of interconnecting portions to the first fastener-receiving portion.

6. The rigid member of claim 1, wherein each interconnecting portion of the plurality of interconnecting portions is circumferentially spaced from an adjacent interconnecting portion.

7. The rigid member of claim 1, wherein the central bore has a diameter of about 0.3 inches.

8. The rigid member of claim 1, wherein the plurality of interconnecting portions are angularly spaced at an angle of about 60 degrees from each other.

9. The rigid member of claim 1, wherein the rigid member is configured to be cut to length for a particular application.

10. A storage bin assembly comprising:
a storage bin, wherein the storage bin comprises side walls;
a first pivot member coupled to a side wall of the side walls by a first plurality of fasteners;
a unitary rigid member between the first pivot member and the side wall to space the first pivot member a particular distance from the side wall, wherein the unitary rigid member comprises:
an outer wall portion substantially concentric to a central axis;
a first inner wall portion offset inward from the outer wall portion, wherein the first inner wall portion is concentric to the central axis;
one or more interconnecting portions that couple the outer wall portion to the first inner wall portion;
a central portion offset inward from the first inner wall portion, wherein the central portion defines a central bore through the unitary rigid member;
second fastener-receiving portions coupled to the first inner wall portion and the central portion, wherein each of the second fastener-receiving portions has a second bore through the unitary rigid member configured to receive a shaft of a fastener of the first plurality of fasteners, and wherein a second bore central axis of each second bore is located a first distance from the central axis; and
a third fastener-receiving portion coupled to the first inner wall portion and the central portion, wherein the third fastener-receiving portion has a third bore through the unitary rigid member configured to receive a shaft of a fastener of the first plurality of fasteners, and wherein a third bore central axis of the third bore is located a second distance from the central axis different than the first distance;
a support wall; and
a second pivot member coupled to the support wall by a second plurality of fasteners, wherein the second pivot member is coupled to the first pivot member in a working relation to enable rotation of the storage bin to an open position and to a closed position.

11. The storage bin assembly of claim 10, wherein the outer wall portion has a substantially circular configuration.

12. The storage bin assembly of claim 10, wherein each of the one or more interconnecting portions is attached to the outer wall portion and extends along a radial line passing through the central axis.

13. The storage bin assembly of claim 10, wherein the outer wall portion and the first inner wall portion are positioned to define openings arranged axially between the first inner wall portion and the outer wall portion.

14. The storage bin assembly of claim 10, wherein each of the one or more interconnecting portions has a first end and a second end, the first end of each of the one or more interconnecting portions being connected to the outer wall portion and the second end of each of the one or more interconnecting portions being connected to the first inner wall portion.

15. The storage bin assembly of claim 10, wherein the one or more interconnecting portions are circumferentially spaced from one another.

16. The storage bin assembly of claim 10, wherein at least two of the one or more interconnecting portions are angularly spaced at an angle of about 66 degrees from each other.

17. The storage bin assembly of claim 10, wherein each second bore has a diameter of about 0.2 inches.

18. The storage bin assembly of claim 10, wherein the unitary rigid member comprises a material selected from at least one of polyester, nylon, polyamide, polyphenylene sulfide, polyethylene, or polypropylene.

19. A storage bin assembly comprising:
a support wall;
a second pivot member coupled to the support wall by a second plurality of fasteners;
a first unitary rigid member between the second pivot member and the support wall to space the second pivot member a first particular distance from the support wall, wherein the first unitary rigid member comprises:
an outer wall portion substantially concentric to a central axis;
a first inner wall portion offset inward from the outer wall portion, wherein the first inner wall portion is concentric to the central axis;
one or more interconnecting portions that couple the outer wall portion to the first inner wall portion;
a central portion offset inward from the first inner wall portion, wherein the central portion defines a central bore through the first unitary rigid member;
second fastener-receiving portions coupled to the first inner wall portion and the central portion, wherein each of the second fastener-receiving portions has a second bore through the first unitary rigid member configured to receive a shaft of a fastener of the second plurality of fasteners, and wherein a second bore central axis of each second bore is located a first distance from the central axis; and
a third fastener-receiving portion coupled to the first inner wall portion and the central portion, wherein the third fastener-receiving portion has a third bore through the first unitary rigid member configured to receive a shaft of a fastener of the second plurality of fasteners, and wherein a third bore central axis of the third bore is located a second distance from the central axis different than the first distance;

a storage bin, wherein the storage bin comprises side walls; and a first pivot member coupled to a side wall of the side walls by a second plurality of fasteners, wherein the first pivot member is coupled to the second pivot member in a working relation to enable rotation of the storage bin to an open position and to a closed position.

20. The storage bin assembly of claim 19, further comprising a second unitary rigid member between the first pivot member and the side wall to space the first pivot member a second particular distance from the side wall.

21. The storage bin assembly of claim 20, wherein a length of the first unitary rigid member is different than a length of the second unitary rigid member.

22. The storage bin assembly of claim 20, wherein the first unitary rigid member and the second unitary rigid member are configured to be cut from a rigid member.

23. The storage bin assembly of claim 19, wherein the first unitary rigid member is bilaterally symmetrical about a line passing through a center of the central bore and a center of the third bore.

24. The storage bin assembly of claim 19, wherein the first unitary rigid member comprises a material selected from at least one of polyester, nylon, polyamide, polyphenylene sulfide, polyethylene, or polypropylene.

25. The storage bin assembly of claim 19, wherein each of the one or more interconnecting portions is attached to the outer wall portion and extends along a radial line passing through the central axis.

\* \* \* \* \*